United States Patent
Lin et al.

(10) Patent No.: US 9,982,161 B2
(45) Date of Patent: May 29, 2018

(54) GRAFT COPOLYMERS WITH GRAFTED POLYMERIC ARMS, THEIR PREPARATION AND USE

(75) Inventors: Hung-Yi Lin, Hsinchu (CN); Li-Chun Yang, Taipei (CN)

(73) Assignee: Deuchem (Shanghai) Chemical Co., Ltd., Shanghai (CN)

( * ) Notice: Subject to any disclaimer, the term of this patent is extended or adjusted under 35 U.S.C. 154(b) by 556 days.

(21) Appl. No.: 14/374,458

(22) PCT Filed: Feb. 14, 2012

(86) PCT No.: PCT/CN2012/071114
§ 371 (c)(1),
(2), (4) Date: Nov. 10, 2014

(87) PCT Pub. No.: WO2013/120249
PCT Pub. Date: Aug. 22, 2013

(65) Prior Publication Data
US 2015/0105514 A1 Apr. 16, 2015

(51) Int. Cl.
| | | |
|---|---|---|
| *C09D 151/08* | (2006.01) | |
| *C09D 151/00* | (2006.01) | |
| *C08F 257/02* | (2006.01) | |
| *C08F 265/06* | (2006.01) | |
| *C08F 283/01* | (2006.01) | |
| *C08F 285/00* | (2006.01) | |

(52) U.S. Cl.
CPC ........ *C09D 151/003* (2013.01); *C08F 257/02* (2013.01); *C08F 265/06* (2013.01); *C08F 283/01* (2013.01); *C08F 285/00* (2013.01); *C09D 151/08* (2013.01)

(58) Field of Classification Search
CPC ........ C09D 151/003; C09D 151/15108; C08F 265/06; C08F 257/02
See application file for complete search history.

(56) References Cited

U.S. PATENT DOCUMENTS

| | | | | |
|---|---|---|---|---|
| 3,716,506 | A | * | 2/1973 | Simms ................ C08F 299/024 525/10 |
| 4,147,688 | A | * | 4/1979 | Makhlouf ................ C08F 2/08 524/461 |
| 6,372,840 | B1 | | 4/2002 | Shalati et al. |
| 2011/0082252 | A1 | * | 4/2011 | Koschabek ............... C08F 8/00 524/558 |

OTHER PUBLICATIONS

Office Action dated Apr. 5, 2017 issued in corresponding Chinese Application 201210034668.9.
English Translation of Office Action dated Apr. 5, 2017 issued in corresponding Chinese Application 201210034668.9.
Office Action dated Dec. 4, 2017 issued in corresponding Chinese Application 201210034668.9.

* cited by examiner

*Primary Examiner* — Peter D. Mulcahy
(74) *Attorney, Agent, or Firm* — Moran, Lewis & Bockius LLP

(57) ABSTRACT

A graft copolymer composition including: a polymeric backbone derived from a plurality polymerizable ethylenically unsaturated monomers; and a plurality of polymeric arms attached pendant to the polymeric backbone. The polymeric arms include: (a) at least two different polymeric arms comprising: a condensation copolymer arm and a random copolymer arm, (b) a polymeric arm having segments of (i) a condensation copolymer segment and (ii) a random copolymer segment, wherein said condensation copolymer segment and random copolymer segment are linked to each other; (c) or combinations thereof.

18 Claims, No Drawings

GRAFT COPOLYMERS WITH GRAFTED POLYMERIC ARMS, THEIR PREPARATION AND USE

FIELD OF INVENTION

The present invention provides for graft copolymer compositions, the method of preparation and use in coatings such as fast-drying coatings used in automobile refinishing.

SUMMARY OF INVENTION

The present invention provides for graft copolymers and their preparation and use. In some embodiments, a graft copolymer composition includes: a polymeric backbone derived from a plurality of polymerizable ethylenically unsaturated monomers; and a plurality of polymeric arms each attached pendant to the polymeric backbone. In some embodiments, each polymeric arm is attached pendant onto the polymeric backbone via a single terminal point. In one such embodiment, each polymeric arm is attached pendant onto the polymeric backbone via an end group having a single terminal ethylenically unsaturated group.

In some embodiments, the polymerizable ethylenically unsaturated monomers used to produce the polymeric backbone include methacrylic acid, acrylic acid, alkyl (meth)acrylate, wherein the alkyl group is a linear alkyl, branched alkyl or cyclic alkyl each alkyl group having 1-18 carbon atoms, hydroxyl alkyl (meth)acrylate wherein the hydroxyl alkyl group is a linear alkyl or branched alkyl each alkyl group having 2-4 carbon atoms, styrene, styrene derivatives and combinations thereof.

In some embodiments, the polymeric arms include at least two different polymeric arms including a condensation copolymer arm and a random copolymer arm. In some such embodiments, the condensation copolymer arm includes a polyester copolymer arm formed from a polyester macromer and the random copolymer arm includes a polyacrylate copolymer arm formed from a polyacrylate macromer. In some such embodiments, the polyester copolymer arm is derived from a plurality of monomers comprising (i) an unsaturated polycarboxylic acid having at least two carboxylic acid moieties; and (ii) a polyol having at least two hydroxyl moieties. In some such embodiments, the polyacrylate arm includes a plurality of polymerizable ethylenically unsaturated monomers.

In some embodiments, the polymerizable ethylenically unsaturated monomers include methacrylic acid, acrylic acid, alkyl (meth)acrylate, wherein the alkyl group is a linear alkyl, branched alkyl or cyclic alkyl each alkyl group having 1-18 carbon atoms, hydroxyl alkyl (meth)acrylate wherein the hydroxyl alkyl group is a linear alkyl or branched alkyl each alkyl group having 2-4 carbon atoms, styrene, styrene derivatives and combinations thereof In other certain embodiments, the polymeric arms include a polyester-polyacrylate copolymer having segments of (i) a condensation copolymer segment and (ii) a random copolymer segment, wherein said condensation copolymer segment and random copolymer segment are linked to each other. In some embodiments, the plurality of polymeric arms includes a polyester-polyacrylate copolymer having (i) a condensation copolymer segment and (ii) a random copolymer segment, wherein said condensation copolymer segment and random copolymer segment are linked to each other.

DETAILED DESCRIPTION OF THE EMBODIMENTS

The present invention provides for graft copolymers and their preparation and use. Such polymers are particularly useful in rapid curing coating formulation for automotive original equipment manufacturers and refinishers and other industrial application. The graft copolymers provide rapid curing, high cross-linked density and leveling and film build of the coating film.

In some embodiments, a graft copolymer composition includes: a polymeric backbone derived from a plurality of polymerizable ethylenically unsaturated monomers; and a plurality of polymeric arms each attached pendant to the polymeric backbone. In certain embodiments, the polymeric arms include at least two different polymeric arms including a condensation copolymer arm and a random copolymer arm. In other certain embodiments, the polymeric arms include a polyester-polyacrylate copolymer having segments of (i) a condensation copolymer segment and (ii) a random copolymer segment, wherein said condensation copolymer segment and random copolymer segment are linked to each other.

For the purposes of this disclosure, "random copolymer arm" and random copolymer segment" are understood to be polymers in which the monomers are incorporated in a random and statistical manner. For the purposes of this disclosure, "segment" refers to a section of a polymer arm.

In some embodiments, each polymeric arm is attached pendant onto the polymeric backbone via a single terminal point. In one such embodiment, each polymeric arm is attached pendant onto the polymeric backbone via an end group having a single terminal ethylenically unsaturated group. In another embodiment, the condensation copolymer arm is attached pendant onto the polymeric backbone via an end group having a single terminal ethylenically unsaturated group. In one such embodiment, the end group is derived from an unsaturated polycarboxylic acid. In yet another embodiment, the random copolymer arm is attached pendant onto the polymeric backbone via an end group having a single terminal ethylenically unsaturated group. In one such embodiment, the end group is derived from an unsaturated methacrylate ester. In still yet another embodiment, a polyester-polyacrylate copolymer arm is attached pendant onto the polymer backbone via an end group having a single terminal ethylenically unsaturated group. In one such embodiment, the end group is derived from an unsaturated methacrylate ester.

Polymeric Backbone

In some embodiments, the graft copolymer compositions of the present invention include a polymeric backbone derived from a plurality polymerizable ethylenically unsaturated monomers. In certain embodiments, the plurality of polymerizable ethylenically unsaturated monomers include hydroxyl alkyl acrylate, hydroxyl alkyl methacrylate, alkyl acrylate alkyl acrylate, alkyl methacrylate, cycloaliphatic acrylate, cycloaliphatic methacrylate, aryl acrylate, aryl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, vinyl aromatics, and combinations thereof, wherein each alkyl group or aromatic group of said monomers may be unsubstituted or substituted.

In other embodiments, the plurality of polymerizable ethylenically unsaturated monomers include methacrylic acid, acrylic acid, alkyl (meth)acrylate, wherein the alkyl group is a linear alkyl, branched alkyl or cyclic alkyl each alkyl group having 1-18 carbon atoms, hydroxyl alkyl (meth)acrylate wherein the hydroxyl alkyl group is a linear alkyl or branched alkyl each alkyl group having 2-4 carbon atoms, styrene, styrene derivatives and combinations thereof. In some such embodiments, the alkyl group of the linear alkyl, branched alkyl or cyclic alkyl each alkyl group has 1-12 carbon atoms.

In certain other embodiments, the plurality of polymerizable ethylenically unsaturated monomers include methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, lauryl methacrylate, cyclohexyl methacrylate, isobornyl methacrylate, stearyl methacrylate, methacrylonitrile, methyl acrylate, ethyl acrylate, n-propyl acrylate, i-propyl acrylate, n-butyl acrylate, i-butyl acrylate, t-butyl acrylate, 2-ethylhexyl acrylate, 2-hydroxyethyl acrylate, hydroxypropyl acrylate, 4-hydroxybutyl acrylate, 2-hydroxyethyl methacrylate or 2-hydroxypropyl methacrylate, styrene, acrylonitrile and combinations thereof.

Polymeric Arms

In some embodiments, the graft copolymer includes a plurality of polymeric arms that include at least two different polymeric arms wherein each polymer arm is attached pendant to the polymer back bone. In certain embodiments, the two different polymeric arms include a condensation copolymer arm and a random copolymer arm. In some embodiments, the condensation copolymer arm includes a polyester copolymer arm formed from a polyester macromer and the random copolymer arm includes a polyacrylate copolymer arm formed from a polyacrylate macromer.

In some embodiments, the graft copolymer of this invention contains about 40-98% by weight, of polymeric backbone, 1-50% by weight of random copolymer arm; and 1-10% by weight of condensation copolymer arm. In some embodiments, the graft copolymer of this invention contains about 40-98% by weight, of polymeric backbone, 1-50% by weight of polyacrylate copolymer arm; and 1-10% by weight of a polyester copolymer arm.

In some embodiments, the graft copolymer having polyester arms and polyacrylate arms has a molecular weight ranging from 10,000 to 30,000 measured by GPC with a polymethyl methacrylate standard. In some embodiments, the graft copolymer having polyester arms and polyacrylate arms has a molecular weight ranging from 15,000 to 25,000 measured by GPC with a polymethyl methacrylate standard.

Condensation Copolymer Arm

In some embodiments, the condensation copolymer arm includes a polyester arm. In some such embodiments, the polyester copolymer arm is derived from a plurality of monomers comprising: (i) an unsaturated polycarboxylic acid having at least two carboxylic acid moieties; and (ii) a polyol having at least two hydroxyl moieties. In other such embodiments, the polyester arm is derived from a combination of at least three monomers including: a polyol having at least two hydroxyl moieties; an unsaturated polycarboxylic acid having at least two carboxylic acid moieties; and a saturated polycarboxylic acid having at least two carboxylic acid moieties.

In some embodiments, the unsaturated polycarboxylic acid, having at least two carboxylic acid moieties, includes an alkylene group having from 4 to 8 carbon atoms. In other embodiments, the unsaturated polycarboxylic acid, having at least two carboxylic acid moieties, includes maleic anhydride, glutaconic acid, hexenedioic acid and combinations thereof.

In some embodiments, the polyol has at least two hydroxyl moieties and a linear alkyl group, a branched alkyl group or a cyclic alkyl group, where each such alkyl group has from 2 to 14 carbon atoms. In other embodiments, the polyol includes ethylene glycol, propylene glycol, neopentyl glycol; 2,2,4-trimethyl-1,3-pentanediol; 2-methyl-1,3-propanediol; 2-ethyl-2-hydroxymethyl-1,3-propanediol, hydroxypivalic hydroxypivalate; 2-butyl-2-ethyl-1,3-propanediol, 1,4-cyclohexanedimethanol; tricyclodecanedimethanol; and combinations thereof.

In some embodiments, the saturated polycarboxylic acid having at least two carboxylic acid moieties includes a linear alkyl group, a branched alkyl group or a cyclic alkyl group, where each alkyl group has from 6 to 36 carbon atoms. In some other embodiments, the saturated polycarboxylic acid includes ethanedioic acid, propanedioic acid, butanedioic acid, pentanedioic acid, hexanedioic acid, 1,4-cyclohexanedicarboxylic acid, and cis-4-cyclohexene-1,2-dicarboxylic anhydride, dimer acid, phthalic anhydride, isophthalic acid, terephthalic acid and combinations thereof.

In some embodiments, the polyester arm includes monomers derived from maleic anhydride, neopentyl glycol, isophthalic acid and 2-ethyl-2-hydroxymethyl-1,3-propanediol.

In some embodiments, the condensation copolymer arm and/or the polyester arm has one ethylenically unsaturated group. In one such embodiment, the polyester arm includes an unsaturated dicarboxylic acid monomer as a linking end unit of the polyester copolymer.

In some embodiments, the polyester arm is linked to the polymeric backbone via a linking unit derived from an unsaturated dicarboxylic acid monomer.

In some embodiments, the polyester arm has a molecular weight ranging from 1,500 to 6,500 measured by GPC with a polymethyl methacrylate standard. In some embodiments, the polyester arm has a molecular weight ranging from 1,500 to 3,000 measured by GPC with a polymethyl metacrylate standard.

Random Copolymer Arm

In some embodiments, the random copolymer arm includes a polyacrylate arm. In certain embodiments, the polyacrylate arm includes a plurality of polymerizable ethylenically unsaturated monomers. In certain embodiments, the plurality of polymerizable ethylenically unsaturated monomers include hydroxyl alkyl acrylate, hydroxyl alkyl methacrylate, alkyl acrylate, alkyl methacrylate, cycloaliphatic acrylate, cycloaliphatic methacrylate, aryl acrylate, aryl methacrylate, acrylonitrile, methacrylonitrile, vinyl aromatics, and combinations thereof, wherein each alkyl group or aromatic group of said monomers may be unsubstituted or substituted.

In certain embodiments, the plurality of polymerizable ethylenically unsaturated monomers include alkyl (meth)acrylate, wherein the alkyl group is a linear alkyl, branched alkyl or cyclic alkyl each alkyl group having 1-18 carbon atoms, hydroxyl alkyl (meth)acrylate wherein the alkyl group is a linear alkyl or branched alkyl each having 2-4 carbon atoms, styrene, styrene derivatives and a mixture thereof. In some such embodiments, the alkyl group of the linear alkyl, branched alkyl or cyclic alkyl each alkyl group has 1-12 carbon atoms.

In certain other embodiments, the plurality of polymerizable ethylenically unsaturated monomers include methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, lauryl methacrylate, cyclohexyl methacrylate, isobornyl methacrylate, stearyl methacrylate, methacrylonitrile, methyl acrylate, ethyl acrylate, n-propyl acrylate, i-propyl acrylate, n-butyl acrylate, i-butyl acrylate, t-butyl acrylate, 2-ethylhexyl acrylate, isobornyl acrylate, 2-hydroxyethyl acrylate, hydroxypropyl acrylate, 4-hydroxybutyl acrylate, 2-hydroxyethyl methacrylate or 2-hydroxypropyl methacrylate, styrene, acrylonitrile and combinations thereof.

In some embodiments, the polyacrylate arm includes monomers derived from 2-ethylhexyl acrylate, 2-hydroxyethyl methacrylate, styrene, and methyl methacrylate.

In some embodiments, the polyacrylate arm has a molecular weight ranging from 4,000 to 10,000 measured by GPC with a polymethyl metacrylate standard. In some other embodiments, the polyacrylate arm has a molecular weight ranging from 5,000 to 8,000 measured by GPC with a polymethyl metacrylate standard.

In some embodiments, the random copolymer arm and/or the polyacrylate arm are made via free radical polymerization process using chain transfer agent with acid group. In some embodiment, the chain transfer agent includes 2-mercaptoacetic acid and 3-mercaptopropionic acid. In some such embodiment, the polyacrylate copolymer has one terminal acid group then reacts with the unsaturated glycidyl ester monomer through acid and glycidyl group to form polyacrylate macromer. In some embodiment, unsaturated glycidyl ester monomer includes glycidyl methacrylate and glycidyl acrylate monomers.

In some such embodiments, the polyacrylate macromer is linked to the polymeric backbone via free radical polymerization process through an unsaturated linking unit derived from a glycidyl methyacrylate monomer.

Polymeric Segments

In some embodiments, the graft copolymer includes a plurality of polymeric arms having at least two segments of different compositions wherein each polymeric arm is attached pendent to the polymeric backbone. In one certain embodiment, the plurality of polymeric arms includes a polyester-polyacrylate copolymer having (i) a condensation copolymer segment and (ii) a random copolymer segment, wherein said condensation copolymer segment and random copolymer segment are linked to each other.

In some embodiments, the graft copolymer of this invention contains about 70-99% by weight, of polymeric backbone, 1-30% by weight of polymeric arm having at least two segments of different compositions. In some embodiments, the graft copolymer of this invention contains about 70-99% by weight, of polymeric backbone, 1-30% by weight of polyester-polyacrylate copolymer arm formed from a polyester-polyacrylate macromer.

In some embodiments, a graft copolymer having a plurality of polyester-polyacrylate copolymer arms has a molecular weight ranging from 5,000 to 15,000 measured by GPC with a polymethyl metacrylate standard. In some embodiments, a graft copolymer having a plurality of polyester-polyacrylate copolymer arms has a molecular weight ranging from 8,000 to 12,000 measured by GPC with a polymethyl metacrylate standard.

Random Copolymer Segment

In some embodiments, the random copolymer arm includes a polyacrylate copolymer arm.

In certain embodiments, the polyacrylate copolymer arm includes a plurality of polymerizable ethylenically unsaturated monomers. In certain embodiments, the plurality of polymerizable ethylenically unsaturated monomers include hydroxyl alkyl acrylate, hydroxyl alkyl methacrylate, alkyl acrylate, alkyl methacrylate, cycloaliphatic acrylate, cycloaliphatic methacrylate, aryl acrylate, aryl methacrylate, acrylonitrile, methacrylonitrile, vinyl aromatics, and combinations thereof, wherein each alkyl group or aromatic group of said monomers may be unsubstituted or substituted.

In certain embodiments, the plurality of polymerizable ethylenically unsaturated monomers include alkyl (meth)acrylate, wherein the alkyl group is a linear alkyl, branched alkyl or cyclic alkyl each alkyl group having 1-18 carbon atoms, hydroxyl alkyl (meth)acrylate wherein the alkyl group is a linear alkyl or branched alkyl each having 2-4 carbon atoms, styrene, styrene derivatives and a mixture thereof. In some such embodiments, the alkyl group of the linear alkyl, branched alkyl or cyclic alkyl each alkyl group has 1-12 carbon atoms.

In certain other embodiments, the plurality of polymerizable ethylenically unsaturated monomers include methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, lauryl methacrylate, cyclohexyl methacrylate, isobornyl methacrylate, stearyl methacrylate, methacrylonitrile, methyl acrylate, ethyl acrylate, n-propyl acrylate, i-propyl acrylate, n-butyl acrylate, i-butyl acrylate, t-butyl acrylate, 2-ethylhexyl acrylate, isobornyl acrylate, 2-hydroxyethyl acrylate, hydroxypropyl acrylate, 4-hydroxybutyl acrylate, 2-hydroxyethyl methacrylate or 2-hydroxypropyl methacrylate, styrene, acrylonitrile and combinations thereof.

In some embodiments, the polyacrylate copolymer segment includes monomers derived from butyl acrylate, 2-hydroxyethyl methacrylate, styrene and methyl methacrylate.

In some embodiments, the polyacrylate copolymer segment has a molecular weight ranging from 4,000 to 10,000 measured by GPC with a polymethyl metacrylate standard.

In some other embodiments, the polyacrylate copolymer segment has a molecular weight ranging from 5,000 to 8,000 measured by GPC with a polymethyl metacrylate standard.

Condensation Copolymer Segment

In some embodiments, the condensation copolymer segment includes a polyester copolymer segment. In some such embodiments, the polyester copolymer segment is derived from a plurality of monomers comprising: (i) an unsaturated polycarboxylic acid having at least two carboxylic acid moieties and (ii) a polyol having at least two hydroxyl moieties In other such embodiments, the polyester copolymer segment is derived from a combination of at least three monomers including: a polyol having at least two hydroxyl moieties; an unsaturated polycarboxylic acid having at least two carboxylic acid moieties; and a saturated polycarboxylic acid having at least two carboxylic acid moieties.

In some embodiments, the unsaturated polycarboxylic acid, having at least two carboxylic acid moieties, includes an alkylene group having from 4 to 8 carbon atoms. In other embodiments, the unsaturated polycarboxylic acid, having at least two carboxylic acid moieties, includes maleic anhydride, glutaconic acid, hexenedioic acid and combinations thereof.

In some embodiments, the polyol has at least two hydroxyl moieties and a linear alkyl group, a branched alkyl group or a cyclic alkyl group, where each such alkyl group has from 2 to 14 carbon atoms. In other embodiments, the polyol includes ethylene glycol, propylene glycol, neopentyl glycol; 2,2,4-trimethyl-1,3-pentanediol; 2-methyl-1,3-propanediol; 2-ethyl-2-hydroxymethyl-1,3-propanediol, hydroxypivalic hydroxypivalate; 2-butyl-2-ethyl-1,3-propanediol, 1,4-cyclohexanedimethanol; tricyclodecanedimethanol; and combinations thereof.

In some embodiments, the saturated polycarboxylic acid having at least two carboxylic acid moieties includes a linear alkyl group, a branched alkyl group or a cyclic alkyl group, where each alkyl group has from 6 to 36 carbon atoms. In some other embodiments, the saturated polycarboxylic acid includes ethanedioic acid, propanedioic acid, butanedioic acid, pentanedioic acid, hexanedioic acid, 1,4-cyclohexanedicarboxylic acid, and cis-4-cyclohexene-1,2-dicarboxylic anhydride, dimer acid, phthalic anhydride, isophthalic acid, terephthalic acid and combinations thereof.

In some embodiments, the polyester copolymer segment includes monomers derived from maleic anhydride, neopentyl glycol, isophthalic acid and 2-ethyl-2-hydroxymethyl-1,3-propanediol.

In some embodiments, the condensation copolymer segment and/or the polyester copolymer segment has one ethylenically unsaturated group. In one such embodiment, the polyester copolymer segment includes a terminal unsaturated dicarboxylic acid monomer which reacts with one or more of the polymerizable ethylenically unsaturated monomers which form the random copolymer segment and/or polyacrylate copolymer segment.

In some embodiments, the polyester copolymer segment has a molecular weight ranging from 1,500 to 6,500 measured by GPC with a polymethyl metacrylate standard. In some embodiments, the polyester copolymer segment has a molecular weight ranging from 1,500 to 3,000 measured by GPC with a polymethyl metacrylate standard.

In some embodiments, the polyester-polyacrylate copolymer is made via free radical polymerization process using a polyester copolymer segment, polymerizable ethylenically unsaturated monomers and chain transfer agent with acid group. In one embodiment, the chain transfer agent includes 2-mercaptoacetic acid. In some such embodiment, the polyester-polyacrylate copolymer has one terminal acid group that reacts with the unsaturated glycidyl ester monomer through acid and glycidyl group to form polyester-polyacrylate macromer. In some embodiment, unsaturated glycidyl ester monomer includes glycidyl methacrylate and glycidyl acrylate monomers. In some such embodiments, the polyester-polyacrylate macromer is linked to the polymeric backbone via free radical polymerization process through an unsaturated linking unit derived from a glycidyl methyacrylate monomer.

In some embodiments, the polyester-polyacrylate macromer includes a glycidyl methyacrylate monomer as a linking end unit. In some embodiments, the polyester-polyacrylate macromer is linked to the polymeric backbone via free radical polymerization process through an unsaturated linking unit derived from a glycidyl methyacrylate monomer.

The arms and segments can be prepared by a number of ways. In one embodiment, a graft copolymer is synthesized in a series of steps. In one embodiment, the plurality of polymeric arms are initially synthesized. The condensation copolymer arm and condensation copolymer segment may be prepared by condensation reaction methods known to those of skill in the art including Azeotrope esterification. Examples of condensation reaction methods are disclosed in U.S. Pat. Nos. 4,018,815 and 4,066,627 each of which are incorporated by reference in its entirety. The random copolymer arm and random copolymer segment may be prepared by free radical polymerization methods known to those of skill in the art. Examples of free radical polymerization methods are disclosed in U.S. Pat. Nos. 4,818,796 and 5,483,004 each of which are incorporated by reference in its entirety. A variety of initiators can be used including t-butyl peroxyacetate, t-butyl peroxybenzoate, t-butyl peroxyoctoate, t-butyl peroxyneodecanoate, t-butyl peroxyisobutyate, t-amyl peroxypivalate, t-butyl peroxypivalate, diisopropyl peroxydicarbonate, dicyclohexyl peroxydicarbonate, dicumyl peroxide, dibenzoyl peroxide, dilaurol peroxide, 1,1-di(tert-butylperoxy)-3,3,5-trimethylcyclohexane and Azo compound such as 2,2'-azobis(isobutyrnitrile). Each of random copolymer arm and condensation copolymer arm are synthesized so to ensure that the resulting polymeric arm only has one ethylenically unsaturated group which will polymerize with the polymerizable ethylenically unsaturated monomers to form the backbone of the graft copolymer. The condensation copolymer segment is synthesized so that it has an unsaturated monomer as an end group so to react with the polymerizable ethylenically unsaturated monomers which form the random copolymer segment of the polymeric arm.

In one embodiment, the preformed polymeric arms are reacted with the polymerizable ethylenically unsaturated monomers which form the backbone of the graft copolymer, in a second step. Such reaction may be performed via free radical polymerization methods. The backbone monomers are copolymerized with the polymeric arms through the single terminal unsaturated group of the polymeric arms using initiators and organic solvents. A variety of initiators can be used including t-butyl peroxyacetate, t-butyl peroxybenzoate, t-butyl peroxyoctoate, t-butyl peroxyneodecanoate, t-butyl peroxyisobutyate, t-amyl peroxypivalate, t-butyl peroxypivalate, diisopropyl peroxydicarbonate, dicyclohexyl peroxydicarbonate, dicumyl peroxide, dibenzoyl peroxide, dilaurol peroxide, 1,1-di(tert-butylperoxy)-3,3,5-trimethylcyclohexane and Azo compound such as 2,2'-azobis(isobutyrnitrile). A variety of organic solvents can be used including butyl acetate, ethyl acetate, propylene glycol monomethyl ether acetate, toluene, xylene, methyl isobutyl ketone, methyl ethyl ketone, ethyl amyl ketone, hexane, heptane, mineral spirits, aliphatic hydrocarbons, cycloaliphatic hydrocarbons, aromatic hydrocarbons, esters, ethers, ketones, and the like.

In some embodiments, graft copolymers of this invention may be used in a variety of solvent borne coatings or paint compositions such as automotive primers, primer surfacers, topcoats which may be monocoats, or basecoats of a clearcoat/basecoat finishes, or clearcoats. These compositions may contain pigment dispersions, additives such as antioxidants, flow control agents, surfactants, UV stabilizers, and rheology control agents such as fumed silica and microgels. They may be used in combination with other film forming polymers such as acrylics, polyesters, polyurethanes, acrylourethanes, polyester urethanes, alkyds, polyethers and the like to adjust the film properties. These coating compositions may also contain crosslinking agents such as polyisocyanates, blocked polyisocyanates, alkylated melamines, and the like. These coatings are also suitable as clear or pigmented coatings in architectural (house paint), industrial, and maintenance coating applications, as well as in ink applications including ink jet printing. The coatings formulated with the copolymers of this invention are particularly suitable for providing coatings on a variety of substrates, such as metal, plastic, composite, paper, wood and concrete substrates. With the control and the flexibility in placing the functional groups at the desired locations at an optimal concentration to suit the application needs from this invention, a much more robust coating can be formed. Graft copolymers of this invention are particularly useful as binders in fast-drying coatings, such as two package (2K)

clearcoat compositions used in automotive refinishing, to be covered with a clear coat finish to add aesthetic appeal.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Example 1

Polyester Copolymer (PEM)

A 1-liter flask was equipped with a heating device, reflux condenser, thermometer, stirrer, water separator, fractionating column and $N_2$ sparge.

|  | Weight (g) |
|---|---|
| Part 1 |  |
| Neopentyl glycol(NPG) | 34.98 |
| Trimethylol propane (TMP) | 13.72 |
| Isophthalic acid (ISOPA) | 22.07 |
| Maleic anhydride | 13.03 |
| Fascat 4100 | 0.03 |
| Water (Removed) | −7 |
| Part 2 |  |
| n-butyl acetate (NBAC) | 23.26 |
| Total | 100 |

The flask was kept under nitrogen positive pressure and the part 1 ingredients were added in order. The mixture was heated to 150° C., and then from 150° C. to 220° C., the temperature was raised at a constant speed in 3 hours. The formed condensation water was successively distilled out the system. When the temperature reached 220° C., the mixture was maintained at the same temperature until the acid value was below 5 mg KOH/g. Part 2 solvent was then added. The final polyester copolymer solution was a light yellow clear polymer solution with OH %=10.0% and solid content about 75%.

Example 2

Preparation of Polyacrylate Copolymer (PAM)

A 1-liter flask was equipped with a condenser, thermometer, stirrer, addition funnels, heater and $N_2$ sparge. The flask was kept under nitrogen positive pressure and the following ingredients were added in order.

|  | Weight (g) |
|---|---|
| Part 1 |  |
| n-butyl acetate (NBAC) | 46.28 |
| Part 2 |  |
| 2-Hydroxyethyl methacrylate (HEMA) | 12.04 |
| Styrene | 20.00 |
| Methyl methacrylate (MMA) | 5.00 |
| 2-ethylhexyl acrylate | 9.26 |
| Mercaptoacetic acid | 1.85 |
| t-butyl peroxybenzoate | 1.86 |
| Part 3 |  |
| Glycidyl methyacrylate (GMA) | 3.72 |
| Total | 100 |
| Monomethyl Ether of Hydroquinone (MEHQ) | 1000 ppm |

Part 1 mixture was charged to the flask and the mixture was heated to temperature 115° C. Part 2 solution was added through the addition funnel over 4 hrs, and the reaction mixture was kept at 115° C. for another 3 hours. Part 3 was added, and then the reaction mixture was held at 120° C. until the acid value was below 5 mg KOH/g. The final polyacrylate solution was a light yellow clear polymer solution with OH %=3.5%, Tg=40° C. (calculated) and solid content about 50%.

Example 3

Preparation of Polyester-Polyacrylate Copolymer (PEPAM)

A 1-liter flask was equipped with a condenser, thermometer, stirrer, addition funnels, heater and $N_2$ sparge. The flask was kept under nitrogen positive pressure and the following ingredients were added in order.

|  | Weight (g) |
|---|---|
| Part 1 |  |
| n-butyl acetate (NBAC) | 42.01 |
| Part 2 |  |
| Example 1: Polyester Copolymer (PEM) | 7.62 |
| 2-Hydroxyethyl methacrylate (HEMA) | 11.29 |
| Styrene | 18.67 |
| Methyl methacrylate (MMA) | 5.38 |
| Butyl acrylate(BA) | 8.08 |
| Mercaptoacetic acid | 1.73 |
| t-butyl peroxybenzoate | 1.73 |
| Part 3 |  |
| Glycidyl methyacrylate (GMA) | 3.49 |
| Total | 100 |
| Monomethyl Ether of Hydroquinone (MEHQ) | 1000 ppm |
| Total |  |

Part 1 mixture was charged to the flask and the mixture was heated to temperature 115° C. Part 2 solution was added through the addition funnel over 4 hours, and the reaction mixture was kept at 115° C. for another 3 hours. Part 3 was added, and then the reaction mixture was held at 120° C. until the acid value was below 5 mg KOH/g. The final copolymer solution was a light yellow clear polymer solution with OH %=4.2% and solid content about 55%.

Example 4

Preparation of Graft Copolymers with Polyacrylate Random Copolymer Arms

A 1-liter flask was equipped with a condenser, thermometer, stirrer, addition funnels, heater and $N_2$ sparge. The flask was kept under nitrogen positive pressure and the following ingredients were added in order.

|  | Weight (g) |
|---|---|
| Part 1 | |
| n-butyl acetate (NBAC) | 22.47 |
| Part 2 | |
| Example 2 Polyacrylate Copolymer (PAM) | 30.00 |
| 2-Hydroxyethyl methacrylate (HEMA) | 13.28 |
| Methyl methacrylate (MMA) | 7.50 |
| Styrene | 17.43 |
| n-butyl methacrylate (NBMA) | 3.50 |
| Lauryl methacrylate (LMA) | 3.50 |
| t-butyl peroxybenzoate | 2.31 |
| Total | 100 |

Part 1 mixture was charged to the flask and the mixture was heated to temperature 125° C. Part 2 solution was added through the addition funnel over 5 hrs, and the reaction mixture was kept at 125° C. for another 3 hours. The final graft polymer solution was a light yellow clear polymer solution with OH %=3.5%, Tg=53° C. (calculated), solid content about 65%.

Example 5

Preparation of Graft Copolymer having Polyacrylate Copolymer and Polyester Copolymer Arms A 1-liter flask was equipped with a condenser, thermometer, stirrer, addition funnels, heater and N₂ sparge. The flask was kept under nitrogen positive pressure and the following ingredients were added in order.

|  | Weight (g) |
|---|---|
| Part 1 | |
| n-butyl acetate (NBAC) | 21.17 |
| Part 2 | |
| Example 2 Polyacrylate Copolymer (PAM) | 28.29 |
| Example 1: Polyester Copolymer (PEM) | 5 |
| 2-Hydroxyethyl methacrylate (HEMA) | 12.51 |
| Methyl methacrylate (MMA) | 6.27 |
| Styrene | 16.80 |
| n-butyl methacrylate (NBMA) | 3.50 |
| Lauryl methacrylate (LMA) | 3.50 |
| t-butyl peroxybenzoate | 2.97 |
| Total | 100 |

Part 1 mixture was charged to the flask and the mixture was heated to temperature 125° C. Part 2 solution was added through the addition funnel over 5 hrs, and the reaction mixture was kept at 125° C. for another 3 hours. The final graft polymer solution was a light yellow clear polymer solution with OH %=3.9%, solid content about 65%.

Example 6

Preparation of Graft Copolymer with Polyester-Polyacrylate Copolymer Arms

A 1-liter flask was equipped with a condenser, thermometer, stirrer, addition funnels, heater and N₂ sparge. The flask was kept under nitrogen positive pressure and the following ingredients were added in order.

|  | Weight (g) |
|---|---|
| Part 1 | |
| n-butyl acetate (NBAC) | 28.93 |
| Part 2 | |
| Example 3 Polyester-Polyacrylate Copolymer (PEPAM) | 9.04 |
| 2-Hydroxyethyl methacrylate (HEMA) | 17.13 |
| Methyl methacrylate (MMA) | 4.52 |
| Styrene | 23 |
| n-butyl methacrylate (NBMA) | 9.23 |
| Lauryl methacrylate (LMA) | 4.42 |
| t-butyl peroxybenzoate | 3.74 |
| Total | 100 |

Part 1 mixture was charged to the flask and the mixture was heated to temperature 125° C. Part 2 solution was added through the addition funnel over 5 hrs, and the reaction mixture was kept at 125° C. for another 3 hours. The final graft polymer solution was a light yellow clear polymer solution with OH %=3.5%, solid content about 65%.

The physical properties of the graft copolymers of Examples 4, 5 and 6 are shown below along with prior art sample Hypomer FS-3060, a linear acrylic polyol resin with solid %=60%, OH %=3.0% by solid

| Sample | FS-3060 | Example 5 | Example 4 | Example 6 |
|---|---|---|---|---|
| SC % | 60.32 | 63.73 | 63.93 | 63.85 |
| Viscosity (cP) | 2200 | 6975 | 11059 | 7377 |
| Acid Value (mg KOH/g) | 11.04 | 2.36 | 1.62 | 1.51 |
| Color (APHA) | 32 | 28 | 22 | 8 |
| Mw | 10688 | 16896 | 20240 | 12124 |
| MP | 7954 | 6977 | 15121 | 8749 |
| Mn | 2941 | 2144 | 4211 | 2566 |
| Pd | 3.64 | 7.88 PEM (5%) & PAM (28.3%) | 4.80 PAM (30%) | 4.72 PEPAM (9%, PE-10%) |

Evaluation process is described below for sanding, gloss, drying speed, leveling and fullness tests. (1) To prepare the metallic basecoat and panel, follow the below instructions and Table 1 formulation.

1) Soak ZX-1755 (aluminum pigment) in NBAC for 30 minutes then filter it in reserve.

2) Mix FS-2451 and CAB -381-2(20%) with solvent, add DeuRheo 201P under 1000 rpm, then disperse under 2500 rpm for 10 minute.

3) Then add aluminum pigment solution 1 and leveling agent mixing under 1000 rpm for 3 minute.

4) Finally add the hardener, Desmodur N3300 to make up the metallic paint, dilute to spray viscosity NK2 10 s by using thinner.

5) Spray on the ABS panel with film thickness around 10~15 μm and then air dry.

TABLE 1

| Metallic basecoat | |
|---|---|
| Sample | Weight (g) |
| Hypomer FS-2451 | 50.0 |
| CAB-381-2 (20% in NBAC) | 25.0 |
| NBAC | 4.7 |
| DeuRheo 201P | 2.0 |
| Levaslip 875 | 0.3 |
| ZX-1755 | 8.0 |
| NBAC | 10.0 |
| Total | 100 |
| Hardener: | — |
| Desmodur N3300 | 7.47 |

Hypomer FS-2451: acrylic polyol resin with solid %=50%, OH %=2.4% by solid CAB-381-2(20% in NBAC): Eastman Cellulose Acetate Butyrate CAB-381-2 dissolved in n-butyl acetate with 20% weight DeuRheo 201P: Polyethylene wax dispersion for anti-settling Levaslip 875: Silicone leveling agent ZX-1755: Aluminium pigment Desmodur N 3300: SC %=100%, NCO %=21.8% (delivery form)

Thinner: NBAC(n-Butyl acetate)/XYL(Xylene)/PMAC (Propylene glycol monomethyl ether acetate)/EAC(Ethyl acetate)=4/3/1/1 (weight ratio)

(2) To prepare the clear topcoat and panel, follow the below instruction and table 2-4 formulations.
1) Prepare base part and hardener separately; add the leveling agent and curing catalyst in the base part.
2) Mix base part with hardener and dilute to spray viscosity NK2 14 s by using thinner.
3) Spray on the polished iron sheet with film thickness 20~25 μm and then air dry for 10 minutes. The panels were separately baked in 50° C. for 10 minutes or placed in 25° C. for 40 minutes, then immediately evaluated using the sanding test.
4) Spray on the metallic basecoat panel, as described in step (1) above, with film thickness 25-30 μm and then air dry for 30 minutes. The panels were separately baked in 50° C., 60° C., 70° C. for 30 minutes, 80° C. for 60 minutes. After cooling, the panel was tested for gloss, drying speed, leveling and fullness tests.
5) The spraying paint is held at 25° C. to observe the gel time.

The below tables describe the various paint formulation used to test various compositions as indicated below. A polyisocyanate was used as the hardener or curing agent. The polyisocyanate sources include: Desmodur N-75: SC %=75%, NCO %=16.5% (delivery form); Desmodur N 3790 BA: SC %=90%, NCO %=17.8% (delivery form); and Desmodur Z 4470 BA: SC %=70%, NCO %=11.9%. The polyurethane thinner composition is XYL(Xylene)/NBAC (n-Butyl acetate)/PMAC(Propylene glycol monomethyl ether acetate)=4/3/1 weight ratio.

TABLE 2

| | | OH/NCO = 1:1 mole | | | | | |
|---|---|---|---|---|---|---|---|
| | | Test No. | | | | | |
| | | 1 | 2 | 3 | 4 | 5 & 7 | 6 & 8 |
| Base part | Resin Sample | FS-3060 | FS-3060 | Example 5 | Example 5 | Examples 4 and 6 | Examples 4 and 6 |
| | Resin Sample, grams | 75.0 | 75.0 | 65.0 | 65.0 | 65.0 | 65.0 |
| | PU thinner, grams | 25.0 | 25.0 | 35.0 | 35.0 | 35.0 | 35.0 |
| | Total, grams | 100.0 | 100.0 | 100.0 | 100.0 | 100.0 | 100.0 |
| Hardener | Hardener, grams | | | | | | |
| | N-75 | 20.21 | — | 24.67 | — | 22.14 | — |
| | N3790 | — | 9.37 | — | 11.44 | — | 10.26 |
| | Z4470BA | — | 14.01 | — | 17.10 | — | 15.35 |
| | NBAC | 4.79 | 1.62 | 8.66 | 4.79 | 2.86 | 7.72 |
| | Total, grams | 125.0 | 125.0 | 133.33 | 133.33 | 125.0 | 133.33 |
| Thinner | dilute to SC % = 37% | 37.59 | 45.92 | 30.87 | 41.04 | 34.07 | 34.86 |

TABLE 3

| | | OH/NCO = 1:1.1 mole | | | | | |
|---|---|---|---|---|---|---|---|
| | | Test No. | | | | | |
| | | 9 | 10 | 11 | 12 | 13 & 15 | 14 & 16 |
| Base part | Resin Sample | FS-3060 | FS-3060 | Example 5 | Example 5 | Examples 4 and 6 | Examples 4 and 6 |

TABLE 3-continued

| | | OH/NCO = 1:1.1 mole | | | | | |
|---|---|---|---|---|---|---|---|
| | | Test No. | | | | | |
| | | 9 | 10 | 11 | 12 | 13 & 15 | 14 & 16 |
| | Resin Sample, grams | 75.0 | 75.0 | 65.0 | 65.0 | 65.0 | 65.0 |
| | PU thinner, grams | 25.0 | 25.0 | 35.0 | 35.0 | 35.0 | 35.0 |
| | Total, grams | 100.0 | 100.0 | 100.0 | 100.0 | 100.0 | 100.0 |
| Hardener | Hardener, grams | | | | | | |
| | N-75 | 22.23 | — | 27.14 | — | 24.35 | — |
| | N3790 | — | 10.31 | — | 12.58 | — | 11.29 |
| | Z4470BA | — | 15.41 | — | 18.81 | — | 16.89 |
| | NBAC | 2.77 | 0 | 6.19 | 1.94 | 0.65 | 5.15 |
| | Total, grams | 125.0 | 125.72 | 133.33 | 133.33 | 125.0 | 133.33 |
| Thinner dilute to SC % = 37% | | 41.68 | 50.13 | 35.87 | 47.05 | 38.55 | 40.28 |

TABLE 4

| | | OH/NCO = 1:0.9 mole | | | | | |
|---|---|---|---|---|---|---|---|
| | | Test No. | | | | | |
| | | 17 | 18 | 19 | 20 | 21 & 23 | 22 & 24 |
| Base part | Resin Sample | FS-3060 | FS-3060 | Example 5 | Example 5 | Examples 4 and 6 | Examples 4 and 6 |
| | Resin Sample, grams | 75.0 | 75.0 | 65.0 | 65.0 | 65.0 | 65.0 |
| | PU thinner, grams | 25.0 | 25.0 | 35.0 | 35.0 | 35.0 | 35.0 |
| | Total, grams | 100.0 | 100.0 | 100.0 | 100.0 | 100.0 | 100.0 |
| Hardener | Hardener, grams | | | | | | |
| | N-75 | 18.19 | — | 22.20 | — | 19.93 | — |
| | N3790 | — | 8.43 | — | 10.30 | — | 9.23 |
| | Z4470BA | — | 12.61 | — | 15.39 | — | 13.82 |
| | NBAC | 6.81 | 3.96 | 7.8 | 7.64 | 5.07 | 10.28 |
| | Total, grams | 125.0 | 125.0 | 130 | 133.33 | 125.0 | 133.33 |
| Thinner dilute to SC % = 37% | | 33.49 | 40.98 | 29.19 | 35.03 | 29.59 | 29.46 |

Evaluation and Test

Follow the below instruction. Test results for various films formed from the above paint formulations are shown in table 5-10.

1) Gloss: Test 20° & 60° gloss of clear topcoat using BYK fog shadow gloss meter.
2) Drying speed test: Test the pencil hardness of clear topcoat under different baking temperature by standard MITSUBISHI pencil.
3) Sanding test: Sand the clear coat on iron sheet using 800 grit sandpaper. For the sanding test results the follow scale is applicable: 1 is sandable; 2 is sandable, but a little sticky; 3 is difficult to sand, and sticky; 4 is unsandable
4) Gel time (hr): Manual mixing, observe when the spraying paint becomes gel.
5) Leveling: Visual observation, observe whether the lamplight image on the clear topcoat under lamplight is straight or not. The leveling test results range from 1 to 5 with 1 being the best and 5 being the worst.
6) Fullness: Visual observation, observe whether the paint film is fullness or not. The fullness test results range from 1 to 5 with 1 being the best and 5 being the worst.

TABLE 5

N-75 curing agent and 0.01% Catacure Tin 22, 0.2% Levelol 839, OH/NCO = 1/1.

| | | Test No. | | | |
|---|---|---|---|---|---|
| | | 1 | 3 | 5 | 7 |
| | Resin Sample | FS-3060 | Example 5 | Example 4 | Example 6 |
| | Gloss (20°/60°) | 95.7/113 | 94.3/110 | 95.5/110 | 94.4/109 |
| Drying speed test | 50° C. × 30 Min Hardness (no mark) | 6B | 4B | 4B | 4B |
| | 60° C. × 30 Min Hardness (no mark) | B | B | B | B |
| | 70° C. × 30 Min Hardness (no mark) | HB | HB | HB | HB |
| | 80° C. × 60 Min Hardness (no mark) | H | H | H | H |
| Sanding test[a] | 50° C. × 10 Min | 2 | near 1 | 1 | 1 |
| | 25° C. × 40 Min | 3-4 | 2 | 1-2 | 1-2 |
| | Gel time (hr) | >6 | 2.3 | 2.3 | 2.3 |
| | Leveling | 1 | 1 | 1-2 | 1 |
| | Fullness | 1 | 1-2 | 2 | 1 |
| | Remark | | PEM (5%) & PAM (28.3%) | PAM (30%) | PEPAM (9%, PE-10%) |

TABLE 6

N 3790/Z 4470 curing agent and 0.01% Catacure Tin 22, 0.2% Levelol 839, OH/NCO = 1/1.

| | | Test No. | | | |
|---|---|---|---|---|---|
| | | 2 | 4 | 6 | 8 |
| | Resin Sample | FS-3060 | Example 5 | Example 4 | Example 6 |
| | Gloss (20°/60°) | 98.5/108 | 97.2/106 | 99.4/110 | 97.3/107 |
| Drying speed test | 50° C. × 30 Min Hardness (no mark) | 4B | 4B | 4B | 4B |
| | 60° C. × 30 Min Hardness (no mark) | B | B | B | B |
| | 70° C. × 30 Min Hardness (no mark) | HB | HB | HB | HB |
| | 80° C. × 60 Min Hardness (no mark) | F | F | F | F |
| Sanding test[a] | 50° C. × 10 Min | 1-2 | near 1 | 1 | 1 |
| | 25° C. × 40 Min | 2-3 | 1-2 | 1-2 | 1-2 |
| | Gel time (hr) | >6 | 4.5 | 4.5 | 4.5 |
| | Leveling | 1 | 1 | 1-2 | 1 |
| | Fullness | 1-2 | 1 | 2 | 1 |
| | Remark | | PEM (5%) & PAM (28.3%) | PAM (30%) | PEPAM (9%, PE-10%) |

TABLE 7

N-75 curing agent and 0.01% Catacure Tin 22, 0.2% Levelol 839, OH/NCO = 1/1.1

| | Test No. | | | |
|---|---|---|---|---|
| | 9 | 11 | 13 | 15 |
| Resin Sample | FS-3060 | Example 5 | Example 4 | Example 6 |
| Gloss (20°/60°) | 102/113 | 99.3/112 | 100/113 | 99.1/111 |

TABLE 7-continued

N-75 curing agent and 0.01% Catacure Tin 22, 0.2% Levelol 839, OH/NCO = 1/1.1

|  |  | Test No. | | | |
|---|---|---|---|---|---|
|  |  | 9 | 11 | 13 | 15 |
| Drying speed test | 50° C. × 30 Min Hardness (no mark) | 5B | 5B | 5B | 5B |
|  | 60° C. × 30 Min Hardness (no mark) | B | B | B | B |
|  | 70° C. × 30 Min Hardness (no mark) | B | HB | HB | HB |
|  | 80° C. × 60 Min Hardness (no mark) | HB | F | F | F |
| Sanding test[a] | 50° C. × 10 Min | 2 | 1-2 | 1-2 | 1-2 |
|  | 25° C. × 40 Min | 3-4 | 2-3 | 2 | 2 |
|  | Gel time (hr) | 7 | 2.2 | 2.2 | 2.2 |
|  | Leveling | 2 | 1-2 | 2 | 1-2 |
|  | Fullness | 2-3 | 1-2 | 3 | 2 |
|  | Remark |  | PEM (5%) & PAM (28.3%) | PAM (30%) | PEPAM (9%, PE-10%) |

TABLE 8

N 3790/Z 4470 curing agent and 0.01% Catacure Tin 22, 0.2% Levelol 839, OH/NCO = 1/1.1

|  |  | Test No. | | | |
|---|---|---|---|---|---|
|  |  | 10 | 12 | 14 | 16 |
| Resin Sample |  | FS-3060 | Example 5 | Example 4 | Example 6 |
| Gloss (20°/60°) |  | 103/114 | 100/111 | 96.0/110 | 97.5/110 |
| Drying speed test | 50° C. × 30 Min Hardness (no mark) | 4B | 4B | 4B | 4B |
|  | 60° C. × 30 Min Hardness (no mark) | B | B | B | B |
|  | 70° C. × 30 Min Hardness (no mark) | HB | HB | HB | HB |
|  | 80° C. × 60 Min Hardness (no mark) | F | F | F | F |
| Sanding test[a] | 50° C. × 10 Min | 1-2 | Near 1 | 1 | 1 |
|  | 25° C. × 40 Min | 3 | 2-3 | 2 | 1-2 |
|  | Gel time (hr) | >6 | 5.0 | 5.0 | 5.0 |
|  | Leveling | 1-2 | 1-2 | 2 | Near 1 |
|  | Fullness | 1 | Near 2 | 2-3 | 2 |
|  | Remark |  | PEM (5%) & PAM (28.3%) | PAM (30%) | PEPAM (9%, PE-10%) |

TABLE 9

N-75 curing agent and 0.01% Catacure Tin 22, 0.2% Levelol 839, OH/NCO = 1/0.9.

|  | Test No. | | | |
|---|---|---|---|---|
|  | 17 | 19 | 21 | 23 |
| Resin Sample | FS-3060 | Example 5 | Example 4 | Example 6 |
| Gloss (20°/60°) | 96.8/114 | 96.9/112 | 96.2/112 | 98.7/112 |

TABLE 9-continued

N-75 curing agent and 0.01% Catacure Tin 22, 0.2% Levelol 839, OH/NCO = 1/0.9.

| | | Test No. | | | |
|---|---|---|---|---|---|
| | | 17 | 19 | 21 | 23 |
| Drying speed test | 50° C. × 30 Min Hardness (no mark) | 6B | 5B | 4B | 4B |
| | 60° C. × 30 Min Hardness (no mark) | 2B | B | B | B |
| | 70° C. × 30 Min Hardness (no mark) | HB | HB | HB | HB |
| | 80° C. × 60 Min Hardness (no mark) | HB | F | F | F |
| Sanding test$^a$ | 50° C. × 10 Min | 2 | 1-2 | 1-2 | 1-2 |
| | 25° C. × 40 Min | 3-4 | 2 | 1-2 | 1-2 |
| | Gel time (hr) | >6 | 2 | 2.3 | 2 |
| | Leveling | 1 | 1-2 | 2-3 | 1-2 |
| | Fullness | 1 | 1-2 | 2 | 1 |
| | Remark | | PEM (5%) & PAM (28.3%) | PAM (30%) | PEPAM (9%, PE-10%) |

TABLE 10

N 3790/Z 4470 curing agent and 0.01% Catacure Tin 22, 0.2% Levelol 839, OH/NCO = 1/0.9

| | | Test No. | | | |
|---|---|---|---|---|---|
| | | 18 | 20 | 22 | 24 |
| Resin Sample | | FS-3060 | Example 5 | Example 4 | Example 6 |
| Gloss (20°/60°) | | 102/114 | 98.4/110 | 99.9/113 | 99.9/111 |
| Drying speed test | 50° C. × 30 Min Hardness (no mark) | 4B | 4B | 4B | 4B |
| | 60° C. × 30 Min Hardness (no mark) | B | B | B | B |
| | 70° C. × 30 Min Hardness (no mark) | HB | HB | HB | HB |
| | 80° C. × 60 Min Hardness (no mark) | F | F | F | F |
| Sanding test$^a$ | 50° C. × 10 Min | 1-2 | Near 1 | 1 | 1 |
| | 25° C. × 40 Min | 2-3 | 2 | 1-2 | 1-2 |
| | Gel time (hr) | >6 | 4.5 | 4.5 | 4.5 |
| | Leveling | 1 | 2 | 3 | 1-2 |
| | Fullness | 2 | 2 | 2-3 | 2 |
| | Remark | | PEM (5%) & PAM (28.3%) | PAM (30%) | PEPAM (9%, PE-10%) |

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A graft copolymer composition comprising:
   (1) a polymeric backbone derived from a plurality polymerizable ethylenically unsaturated monomers to form a poly(meth)acrylate backbone; and
   (2) a plurality of polymeric arms each attached pendant to the polymeric backbone via an end group having a single terminal ethylenically unsaturated group, said polymeric arms are independently selected from the group consisting of:

(a) at least two different polymeric arms comprising: a polyester copolymer arm and a polyacrylate arm;
(b) a polymeric arm having segments of (i) a polyester copolymer segment and (ii) an acrylate copolymer segment, wherein said polyester copolymer segment and acrylate copolymer segment are linked to each other; and
(c) combinations thereof.

2. The graft copolymer composition of claim 1, wherein each of the plurality of polymerizable ethylenically unsaturated monomers are each independently selected from the group consisting of: methacrylic acid, acrylic acid, alkyl (meth)acrylate wherein the alkyl group is a linear alkyl, branched alkyl or cyclic alkyl each alkyl group having 1-18 carbon atoms, hydroxyl alkyl (meth)acrylate wherein the alkyl group is a linear alkyl or branched alkyl each having 2-4 carbon atoms, styrene, styrene derivatives and a mixture thereof.

3. The graft copolymer composition of claim 1, wherein the polyester copolymer arm is derived from a plurality of monomers comprising a combination of (i) an unsaturated polycarboxylic acid having at least two carboxylic acid moieties; and (ii) a polyol having at least two hydroxyl moieties to form the polyester copolymer arm.

4. The graft copolymer composition of claim 1, wherein the polyester copolymer arm is derived from a combination of three monomers comprising: a polyol having at least two hydroxyl moieties; an unsaturated polycarboxylic acid having at least two carboxylic acid moieties; and a saturated polycarboxylic acid having at least two carboxylic acid moieties to form the polyester copolymer arm.

5. The graft copolymer composition of claim 3 or 4, wherein the polyol has at least two hydroxyl moieties and is independently selected from the group consisting of: ethylene glycol, propylene glycol, neopentyl glycol; 2,2,4-trimethyl-1,3-pentanediol; 2-methyl-1,3-propanediol; 2-ethyl-2-hydroxymethyl- 1,3-propanediol, hydroxypivalic hydroxypivalate; 2-butyl-2-ethyl- 1,3-propanediol, 1,4-cyclohexanedimethanol; tricyclodecanedimethanol; and combinations thereof.

6. The graft copolymer composition of claim 3 or 4, wherein the unsaturated polycarboxylic acid having at least two carboxylic acid moieties is independently selected from maleic anhydride, glutaconic acid, hexenedioic acid and combinations thereof.

7. The graft copolymer composition of claim 4, wherein the saturated polycarboxylic acid having at least two carboxylic acid moieties is independently selected from ethanedioic acid, propanedioic acid, butanedioic acid, pentanedioic acid, hexanedioic acid, 1,4-cyclohexanedicarboxylic acid, cis-4-cyclohexene-1,2-dicarboxylic anhydride, dimer acid, phthalic anhydride, isophthalic acid, terephthalic acid and combinations thereof.

8. The graft copolymer composition of claim 1, wherein the polyacrylate arm is derived from a plurality of polymerizable ethylenically unsaturated monomers to form the polyacrylate arm.

9. The graft copolymer composition of claim 8, wherein the polyacrylate arm is derived from at least four polymerizable ethylenically unsaturated monomers each independently selected from the group consisting of: alkyl (meth) acrylate wherein the alkyl group is a linear alkyl, branched alkyl or cyclic alkyl each alkyl group having 1-18 carbon atoms, hydroxyl alkyl (meth)acrylate wherein the alkyl group is a linear alkyl or branched alkyl each having 2-4 carbon atoms, styrene, styrene derivatives and a mixture thereof to form the polyacrylate arm.

10. The graft copolymer composition of claim 1, wherein the polyester copolymer segment is derived from a plurality of monomers comprising (i) an unsaturated polycarboxylic acid having at least two carboxylic acid moieties and (ii) a polyol having at least two hydroxyl moieties to form the polyester copolymer segment.

11. The graft copolymer composition of claim 1, wherein the polyester copolymer segment is derived from at least three monomers each independently selected from: a polyol having at least two hydroxyl moieties; an unsaturated polycarboxylic acid having at least two carboxylic acid moieties; and a saturated polycarboxylic acid having at least two carboxylic acid moieties to form the polyester copolymer segment.

12. The graft copolymer composition of claim 10 or 11, wherein the polyol has at least two hydroxyl moieties is independently selected from the group consisting of: ethylene glycol, propylene glycol, neopentyl glycol; 2,2,4-trimethyl-1,3-pentanediol; 2-methyl-1,3-propanediol; 2-ethyl-2-hydroxymethyl-1,3-propanediol, hydroxypivalic hydroxypivalate; 2-butyl-2-ethyl-1,3-propanedial, 1,4-cyclohexanedimethanol; tricyclodecanedimethanol; and combinations thereof.

13. The graft copolymer composition of claim 10, wherein the unsaturated polycarboxylic acid having at least two carboxylic acid moieties is independently selected from maleic anhydride, glutaconic acid, hexenedioic acid and combinations thereof.

14. The graft copolymer composition of claim 11, wherein the saturated polycarboxylic acid having at least two carboxylic acid moieties is independently selected from ethanedioic acid, propanedioic acid, butanedioic acid, pentanedioic acid, hexanedioic acid, 1,4-cyclohexanedicarboxylic acid, cis-4-cyclohexene-1,2-dicarboxylic anhydride, dimer acid, phthalic anhydride, isophthalic acid, terephthalic acid and combinations thereof.

15. The graft copolymer composition of claim 1, wherein the polyacrylate segment is derived from a plurality of polymerizable ethylenically unsaturated monomers to form the polyacrylate segment.

16. The graft copolymer composition of claim 1, wherein the polyacrylate segment is derived from at least four polymerizable ethylenically unsaturated monomers each independently selected from the group consisting of: alkyl (meth)acrylate wherein the alkyl group is a linear alkyl, branched alkyl or cyclic alkyl each alkyl group having 1-18 carbon atoms, hydroxyl alkyl (meth)acrylate wherein the alkyl group is a linear alkyl or branched alkyl each having 2-4 carbon atoms, styrene, styrene derivatives and a mixture thereof to form the polyacrylate segment.

17. A coating composition comprising the graft copolymer composition of claim 1.

18. A coated substrate having coated end cured thereon a dried layer of the graft copolymer composition of claim 1.

* * * * *